United States Patent [19]

Hemphill et al.

[11] Patent Number: 4,575,280
[45] Date of Patent: Mar. 11, 1986

[54] UNDERWATER TRENCHER WITH PIPELAYING GUIDE

[75] Inventors: Dean P. Hemphill, Houston; Paul R. Scott, Brazoria, both of Tex.

[73] Assignee: Shell Oil Company, Houston, Tex.

[21] Appl. No.: 562,363

[22] Filed: Dec. 16, 1983

[51] Int. Cl.⁴ .............................................. F16L 1/04
[52] U.S. Cl. .................................. 405/164; 405/159; 405/163
[58] Field of Search ............................ 405/159–165, 405/273, 282

[56] References Cited

U.S. PATENT DOCUMENTS

| Re. 23,963 | 3/1955 | Collins | 405/162 |
| 3,333,432 | 8/1967 | Hale et al. | 405/164 |
| 3,368,358 | 2/1968 | Elliott | 405/163 |
| 3,431,740 | 3/1969 | Lamy | 405/165 |
| 3,505,826 | 4/1970 | Harmstorf | 405/163 |
| 3,750,409 | 8/1973 | Orfei | 405/283 |
| 4,114,390 | 9/1978 | Van Steveninck et al. | 405/163 |
| 4,126,013 | 11/1978 | McGovern | 405/169 |

FOREIGN PATENT DOCUMENTS 2840587  3/1980  Fed. Rep. of Germany.

*Primary Examiner*—Dennis L. Taylor

[57] ABSTRACT

A process and apparatus are provided for the simultaneous trenching and installation of submarine pipelines. The apparatus is based on a single unit which includes an excavating portion, an attached ditch sidewall retention shield, and a pipeline installation guide. The excavator creates a trench of a slightly larger cross section than required, the shield prevents the trench from closing due to the collapse of the sidewalls, and the pipe guide causes the pipeline to be deflected into that portion of the trench protected by the shield. The pipeline is fabricated on the surface of the sea or on floating ice, and is supported and guided to enter the forward portion of the shield by a stinger or other means, when required.

22 Claims, 5 Drawing Figures

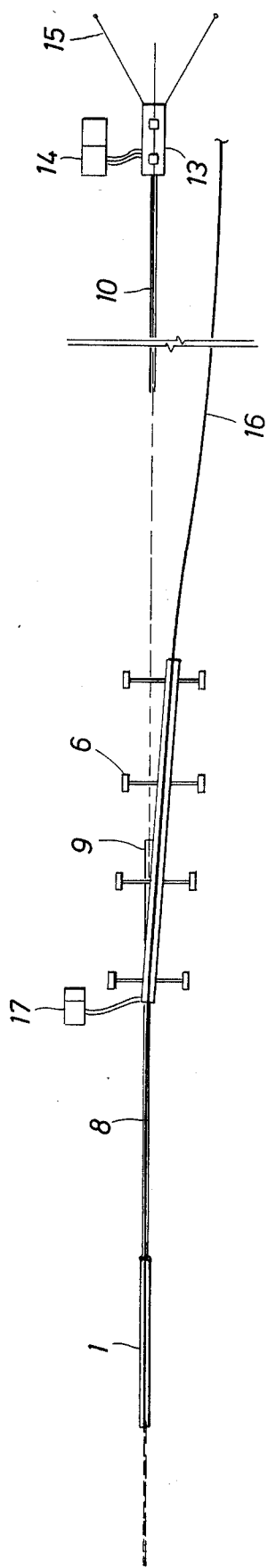
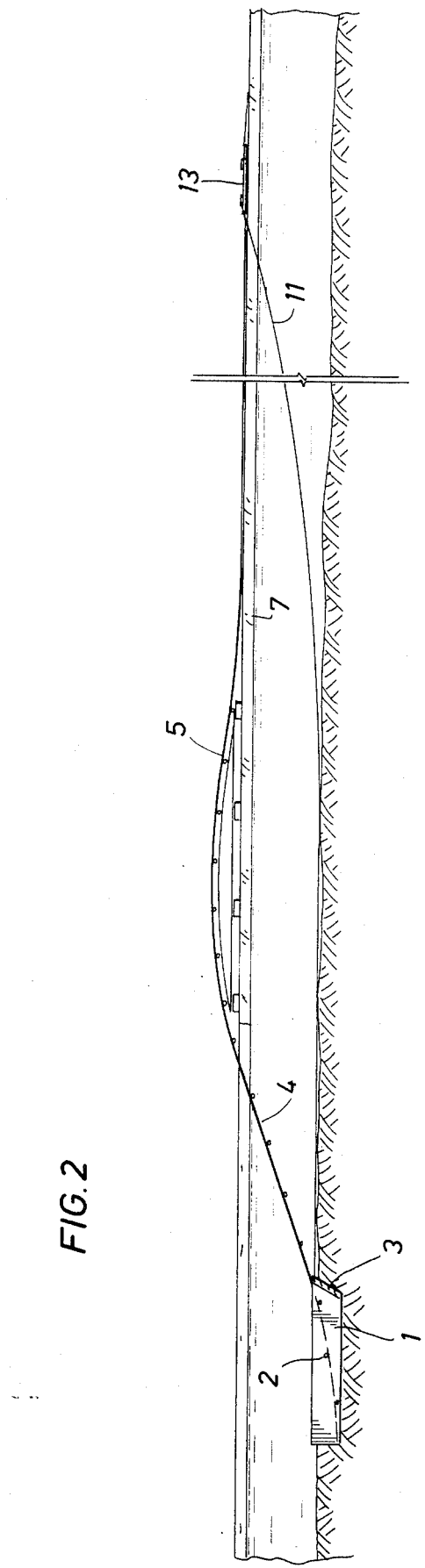

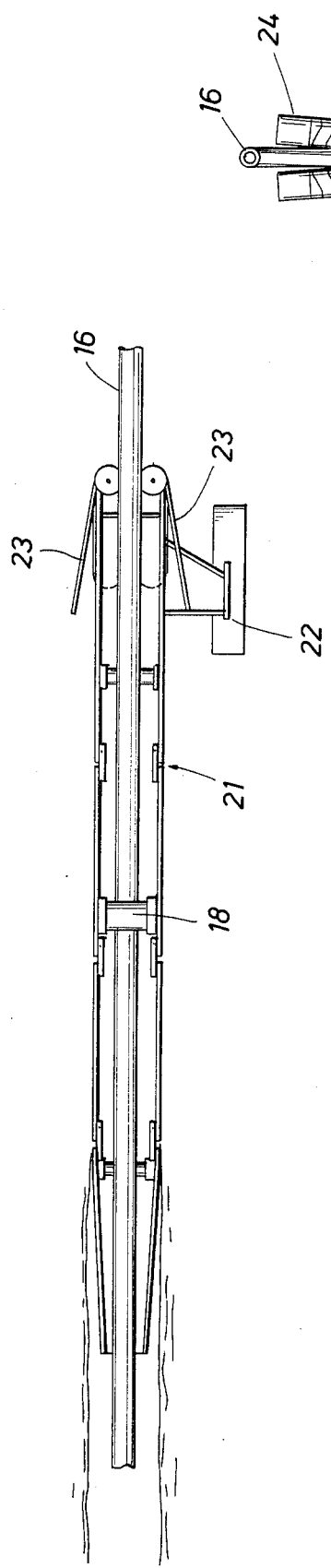
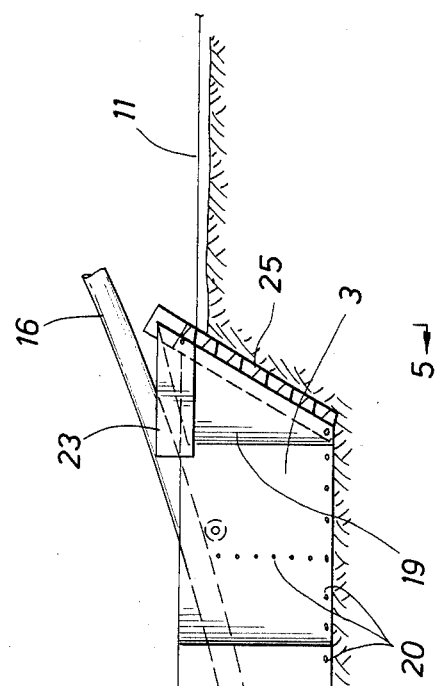
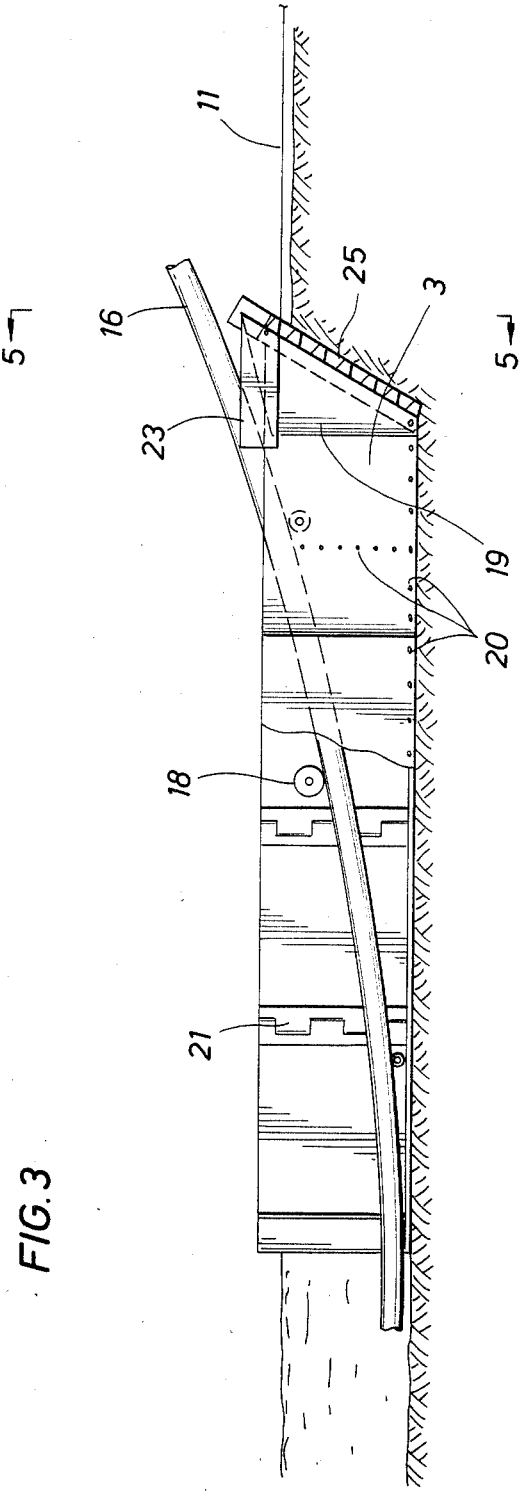

UNDERWATER TRENCHER WITH PIPELAYING GUIDE

BACKGROUND OF THE INVENTION

When large diameter, relatively stiff pipes are lowered into an undersea trench, the usual elastic curvature is such that an unacceptably long span develops, and the corresponding open section of the trench may be too long to be practical unless stable slopes have been cut. For example, if a 12-foot deep trench were in a sandy soil, the slope of the trench sidewalls might be on the order of 1 in 3, and the amount of soil to be excavated would be five times that of a vertical sidewall ditch. Accordingly, it is not only desirable to reduce the volume of the soil to be excavated, but further to prevent infilling of the soil until the pipe has reached the bottom of the ditch, both to reduce power requirements and save time in construction.

Applicants are not aware of any prior art references which, in their opinion as one skilled in the pipeline art, would anticipate or render obvious the novel method and apparatus of the instant invention; however, for purposes of fully developing the background of the invention and establishing the state of the requisite art, the following reference is set forth: "New Machine Trenches and Backfills Subsea Lines", Pipe Line Industry, October 1981.

SUMMARY OF THE INVENTION

The primary purpose of the present invention is to provide a method and apparatus for the simultaneous trenching and installation of submarine pipelines by a technique which greatly reduces the volume of soil to be excavated by preventing infilling until the pipe has reached the bottom of the trench, which method and apparatus are relatively convenient and economical to use and saving of construction time, and which greatly reduce power requirements. First, a trench is formed while simultaneously an elongated shield is positioned in the trench to prevent the sidewalls of the trench from collapsing. Then, a pipeline is deflected into the trench so that the pipeline enters the trench at one end of the shield and approaches the bottom of the trench before exiting at the other end of the shield. Preferably, the pipeline is subjected to bending strain, for example in the range of about 0.2 to 0.3 percent or greater, which greatly reduces the length of shield required. The pipeline can be laid along a curving path, either curving in the horizontal or the vertical plane, by utilizing a shield which is articulated and which follows a curving trench. The shield preferably has pipe guides such as rollers which deflect or bend the pipe into the path of the trench.

Other purposes, distinctions over the art, advantages and features of the invention will be apparent to one skilled in the art upon review of the following:

BRIEF DESCRIPTION OF THE DRAWINGS

FIG. 1 provides a plan view and

FIG. 2 provides an elevation view of the present invention.

FIG. 3 shows an elevation view and partial section of the trench shield and excavating module of FIGS. 1 and 2.

FIGS. 4 and 5 show plan and end views of the trench shield and excavating module of FIG. 3.

DESCRIPTION OF PREFERRED EMBODIMENTS

The present invention pertains to an apparatus and method for the simultaneous trenching and installation of submarine pipelines. The apparatus includes, in a single unit, an excavating portion, an attached ditch sidewall retention shield, and a pipeline installation guide. The excavator creates a trench of slightly larger cross section than required, the shield prevents the trench from closing due to collapse of the sidewalls, and the pipe guide causes the pipeline to be deflected into that portion of the trench protected by the shield. The pipeline preferably is fabricated on the surface of the sea or on floating ice, and is supported and guided to enter the forward portion of the shield by a stinger or other means, when required.

The length of the shield is reduced by a significant amount by causing the pipeline to bend to a selected radius of curvature that is based on an acceptable bending strain in the pipe, e.g., a steel pipe. In the construction of such submarine pipelines, it is feasible to control bending strains by moment limiting structures or stingers, with acceptable values of strain being in the range, for example of about 0.2 to 0.3 percent or greater. In the case of many of the relatively stiff pipelines that can be constructed using the present invention, a pipe guide is required to bend the pipe within the protective retention shield to achieve the desired curvature. Guides, or rollers acting downward, in conjunction with other guides providing the upward reaction, accomplish the bending task with reasonable forces.

The present invention preferably is fabricated in essentially identical segments, for example, about 20 feet in length, for convenience in transporation, installation and maintenance. Preferably, the segments are joined by loose hinges or attachments so that the shield is better able to negotiate gradual turns or course corrections, as well as changes in inclination. The forward segment preferably mounts the excavating and spoil handling components of the invention, as well as provides for the attachment to a pipe stinger and/or pulling means, e.g., a tractor or cable. The first of the pipe support guides preferably is within the first segment. The remaining segments preferably restrain the sidewalls of the trench and carry the other pipe guides.

The excavator preferably cuts a trapezoidal trench section by means of two or more counter rotating mechanical cutters or an array of low and high pressure water jets, etc. Although a rectangular trench must be dug, a trapezoidal cross section facilitates removal and replacement of individual cutters without interfering with the pipeline which is suspended above. The mechanical cutters may be side-cutting augers, specially configured cylindrical dredge-type cutters, etc. When needed, separate spoil removal components are added to the excavating unit. Spoil removal and transport may be accomplished by the augers, by a water educter, air lift, dredge pump, etc.

As an indication of the practical shield lengths achieved in accordance with the invention by controlled bending of the pipe, consider an allowable strain of 0.2 percent: a 16-inch pipeline will require a total shield length of 80 feet, while a 24-inch pipe would require only 100 feet of shield—both cases for a 12-foot deep trench. If a strain of 0.3 percent is acceptable, the required shield lengths would be reduced by 10 to 20 feet.

Having thus generally described the apparatus and method of the invention, as well as its advantages over the art, the following is a detailed description thereof given in accordance with specific reference to the drawings.

FIGS. 1 and 2 respectively show plan and elevational views of the invention. A trench shield 1 having guide rollers 2, has at the forward end thereof, excavating module 3. A stinger 4 may be used in carrying the preassembled pipeline 16 into the trench shield 1. A moment limiting guide 5 is provided on top of a carriage 6 which may be articulated and/or adjustable. The carriage 6 rests on ice 7 and straddles a narrow slot 8 in ice 7 through which the pipeline 16 is passed. Slot cutting means 9 (e.g., a vehicle mounted chain saw) is provided just beneath or ahead of the carriage 6. A cable slot 10 permits a pull cable 11 to be passed therethrough and to extend down to the trench shield and excavating module 1 and 3 respectively. Pull cable end 12 is led through pull winch 13 (e.g., a linear cable pulling winch) with power supplied from a winch power module 14. Pull winch 13 is attached to one or more anchors 15 by means of chains or cables. Anchors 15 may be placed well in advance of actual use. An excavator power vehicle 17 is provided to furnish electric or hydraulic power to the underwater excavator by means of cable, hose or pipelines, which may be supported by the stinger, if one is being used.

The pulling force may also be applied to the underwater apparatus by tractors, etc. pulling on the stinger or on cables leading directly to the apparatus, by tractive devices reacting against the material of the sea bottom or the bottom or sidewalls of the trench itself.

In FIGS. 3, 4 and 5 elevation, plan and front views provide details of the trench shield and excavating module of the invention. Trench shield 1 is provided with rollers 18 both above and below the pipeline 16. Excavating module 3 has cutter section 19 which may be lengthened if required. Traction for the shield as above noted is provided by a pull cable 11. Cutters 25 may be tilted or advanced or retracted into the work space by hydraulic pistons internal to the unit (not shown). The cutters may also be raised or lowered relative to the module as a means of adjusting the elevation of the trench bottom. Water and/or air jets 20 may be provided on the outside of the trench shield in order to reduce frictional resistance to movement of the shield through the soil.

Articulation 21 is shown in FIG. 4 which is preferably hinges with loose pins which allow about a 2 to 5-degree flex between sections of the trench shield and the excavating module and serve to maintain the trench shield at an appropriate level in the soil, and to allow the shield to negotiate a horizontal curve. Mold board 23 at either side of the excavating module serves to push spoil away from the trench shield 1.

FIG. 5 is a front view of the excavating module 3 and shows motor 24 which may be hydraulic or electric powered and which powers the cutters 25 (e.g., augers) which are tiltable to form a trapezoidal cross section, for example, about 16 degrees apart, to clear the suspended pipeline 16 in the event cutters are to be replaced while the module remains in the trench.

The foregoing description of the invention is merely intended to be explanatory hereof and various changes in the details of the described method and apparatus may be made within the scope of the appended claims without departing from the spirit of the invention.

What is claimed is:

1. A method for laying a relatively stiff pipeline into a soil trench beneath ice covering water, said soil trench having sidewalls susceptible to collapsing, comprising:
   cutting an elongated slot in the ice;
   forming the trench beneath the ice slot;
   positioning an elongated shield in the trench to prevent the sidewalls of the trench from collapsing:
   guiding the pipeline through the ice slot and into the trench shield with an adjustable carriage which arcs the pipeline just before the pipeline passes through the ice slot and controls alignment and angle of entry of the pipeline into the trench shield; and
   deflecting the pipeline into the trench so that the pipeline enters the trench at one end of the shield and approaches the bottom of the trench before exiting at the other end of the shield.

2. The method of claim 1 including cutting a second slot in the ice forward of where the pipeline is guided through the ice slot and pulling the elongated shield by means extending through the second ice slot.

3. The method of claim 1 wherein the trench is formed with trenching means integral with the shield.

4. The method of claim 1 wherein the adjustable carriage is articulated.

5. The method of claim 4 wherein the bending means are pipe guides.

6. The method of claim 5 wherein the pipe guides are rollers.

7. The method of claim 1 wherein the shield is articulated.

8. The method of claim 1 including:
   forming the trench along a curving path; and
   articulating the shield to following the curving trench.

9. The method of claim 8 wherein the path is curving in a horizontal plane.

10. The method of claim 8 wherein the path is curving in a vertical plane.

11. An apparatus for laying a relatively stiff pipeline into a soil trench beneath ice covering water, said soil trench having sidewalls susceptible to collapsing; comprising:
    means for cutting an elongated slot in the ice;
    means for forming the trench beneath the ice slot;
    an elongated shield positionable in the trench to prevent the sidewalls of the trench from collapsing;
    an adjustable carriage for arcing the pipeline and guiding the pipeline through the ice slot and into the trench shield while controlling alignment and angle of entry of the pipeline into the trench shield; and
    means for deflecting the pipeline into the trench so as to induce a desired bending strain in the pipe as the pipeline enters the trench at one end of the shield and approaches the bottom of the trench before exiting at the other end of the shield.

12. The apparatus of claim 11 wherein the trenching means is integral with the shield.

13. The apparatus of claim 11 wherein the deflecting means are pipe guides.

14. The apparatus of claim 13 wherein the pipe guides are rollers.

15. The apparatus of claim 11 wherein the shield is articulated.

16. The apparatus of claim 11 including means for cutting a second slot in the ice forward of where the pipeline is guided through the ice slot and means for pulling the elongated shield extending through the second ice slot.

17. The apparatus of claim 11 wherein the shield is articulatable in a horizontal plane.

18. The apparatus of claim 11 wherein the shield is articulatable in a vertical plane.

19. The apparatus of claim 11 wherein the adjustable carriage is articulated.

20. The apparatus of claim 19 including a stinger extending from the carriage and operative to carry the pipeline into the elongated shield.

21. A method for laying a relatively stiff pipeline into a soil trench beneath ice covering water, said soil trench having sidewalls susceptible to collapsing, comprising:
   cutting an elongated slot in the ice;
   forming the trench beneath the ice slot along a curving path;
   positioning an elongated, articulated shield in the trench to follow the curving path and prevent the sidewalls of the trench from collapsing;
   guiding the pipeline through the ice slot and into the trench shield while controlling alignment and angle of entry of the pipeline into the trench shield; and
   deflecting the pipeline into the trench so that the pipeline enters the trench at one end of the shield and approaches the bottom of the trench before exiting at the other end of the shield.

22. An apparatus for laying a relatively stiff pipeline into a soil trench beneath ice covering water, said soil trench having sidewalls susceptible to collapsing; comprising:
   means for cutting an elongated slot in the ice;
   means for forming the trench along a curving path beneath the ice slot;
   an elongated, articulated shield positionable in the trench to follow the curving path and prevent the sidewalls of the trench from collapsing;
   means for guiding the pipeline through the ice slot and into the trench shield while controlling alignment and angle of entry of the pipeline into the trench shield; and
   means for deflecting the pipeline into the trench so as to induce a desired bending strain in the pipe as the pipeline enters the trench at one end of the shield and approaches the bottom of the trench before exiting at the other end of the shield.

* * * * *